United States Patent
Mertz et al.

(10) Patent No.: US 9,246,597 B2
(45) Date of Patent: Jan. 26, 2016

(54) DUAL RATE QPSK/TCM-QPSK OPTICAL MODULATION

(75) Inventors: Pierre Mertz, Baltimore, MD (US); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 510 days.

(21) Appl. No.: 12/826,277

(22) Filed: Jun. 29, 2010

(65) Prior Publication Data

US 2011/0255875 A1    Oct. 20, 2011

Related U.S. Application Data

(60) Provisional application No. 61/324,355, filed on Apr. 15, 2010.

(51) Int. Cl.
*H04B 10/516* (2013.01)
*H04B 10/556* (2013.01)

(52) U.S. Cl.
CPC ........ *H04B 10/5161* (2013.01); *H04B 10/5561* (2013.01)

(58) Field of Classification Search
None
See application file for complete search history.

(56) References Cited

U.S. PATENT DOCUMENTS

| | | | | |
|---|---|---|---|---|
| 4,489,418 A | * | 12/1984 | Mazo | 375/246 |
| 6,144,474 A | * | 11/2000 | Nitta et al. | 398/212 |
| 2003/0016421 A1 | * | 1/2003 | Small | 359/172 |
| 2007/0217791 A1 | * | 9/2007 | Price | 398/152 |

OTHER PUBLICATIONS

Ungerboeck, et al., "Codes for QPSK Modulation with Invariance Under 90 Rotation", Proceedings of the Mobile Satellite Conference, JPL Publication 88-9, pp. 277-282, May 3-5, 1988.*

* cited by examiner

*Primary Examiner* — Darren E Wolf
(74) *Attorney, Agent, or Firm* — David L. Soltz

(57) ABSTRACT

The present disclosure allows for optical link capacity to be optimized based on transmission parameters, such as amplifier gain, link loss, optical signal-to-noise ratio. For example, optical signals at wavelengths that are susceptible to impairments, such as non-linear effects, or that are not adequately amplified by an optical amplifier, may be modulated in accordance with lower rate/less spectrally efficient modulation formats ("low rate formats") that are more noise tolerant. On the other hand, those optical signals at wavelengths that are less susceptible to or do not incur such impairments may be modulated in accordance with highly spectrally efficient/higher rate modulation formats ("high rate formats") that are more noise sensitive. Accordingly, a maximum or optimized capacity may be realized through appropriately choosing, for each channel, a particular modulation format and channel spacing. Such optimized capacity can be readily obtained with adaptive driver circuits.

3 Claims, 12 Drawing Sheets

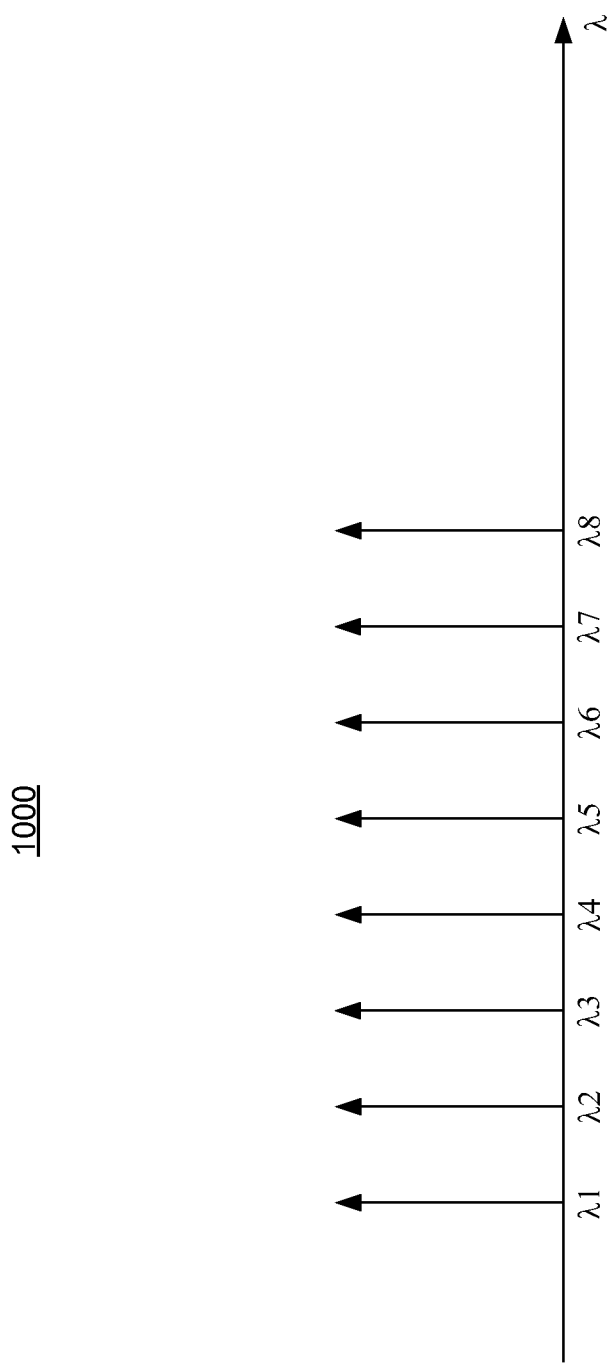

DUAL RATE QPSK/TCM-QPSK OPTICAL MODULATION

This application claims the benefit of U.S. Provisional Application No. 61/324,355, filed on Apr. 15, 2010, the entire contents of which are incorporated herein by reference.

BACKGROUND

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. The wavelengths are typically separated from one another by a channel or spectral spacing.

Typically, the optical signals are modulated in accordance with a modulation format. Various modulation formats are known, such as on-off-keying (OOK), differential phase shift keying (DPSK), differential quadrature phase shift keying (DQPSK), binary phase shift keying (BPSK). As generally understood, different modulation formats may have different optical characteristics. For example, certain modulation formats may be more sensitive to noise, and thus may be associated with a higher bit error rate if noise is present on a given optical link. In addition, some modulation formats may have a higher spectral density and thus can carry more data per unit of spectrum than others. Still others may have a higher tolerance for polarization mode dispersion (PMD), such that certain modulation formats may require little or no PMD compensation compared to others for a given amount of PMD.

In general, those modulation formats that have a higher spectral density, such that more information or bits are carried per unit of spectrum, will typically have less energy per bit. As a result, high spectral density modulation formats are more susceptible to transmission non-idealities, and thus will have higher bit error rates for a given amount of PMD or optical signal noise, for example. Accordingly, such modulation formats may be used to carry data at relatively higher rates over shorter distances. On the other hand, those modulation formats that require more energy per bit may have lower bit error rates and are spectrally less efficient. Such low spectral density modulation formats, therefore, may be used to carry data over longer distances.

Conventional WDM systems typically include a series of printed circuit boards or cards, such that each one supplies or outputs a corresponding optical channel. Such cards typically include discrete components, such as a laser, modulator, and modulator driver circuit which are associated with each channel. Typically, different cards are provided for different optical links, such that optical signals having an appropriate modulation format are supplied to a given link. For example, specific cards may be provided to supply signals that are transmitted over long distance links, such as those which may be used in undersea or submarine systems, while other cards may be provided to supply signal to shorter distance terrestrial links. Thus, cards are often tailored for different optical links. As a result, the costs for manufacturing each card may be excessive.

Moreover, fiber optic communications systems for transmitting with a spectral efficiency 2 bits/s/Hz typically may use a PM-QPSK (polarization multiplexed-quadrature phase shift keying) modulation format. Although this modulation format performs well for links up to about 2000 km, beyond that, PM-QPSK signals may have a relatively high number of errors (i.e., have a high bit error rate) that typically cannot be corrected with conventional forward error correction (FEC) techniques. Accordingly, there is a need for a WDM transmitter that can transmit optical signals having a modulation format that has lower spectral efficiency for transmission over longer distances or over optical links having significant impairments (e.g. noise or non-linearities, such as cross-phase modulation or four wave mixing) and can also transmit optical signals having another modulation format that can transmit over shorter distances or over links have reduced impairments. In other words, there is a need for a WDM system that has optimized data carrying capacity

SUMMARY

Consistent with an aspect of the present disclosure, an apparatus is provided that comprises a laser configured to supply an optical signal, and a driver circuit having an input for receiving a control signal. The driver circuit is configured to select one of a plurality of drive signals in response to the control signal. An optical modulator is also provided that is configured to modulate the optical signal. Each of the plurality of drive signals corresponds to a respective one of a plurality of modulation formats, such that the modulated optical signal has a corresponding one of the plurality of modulation formats in response to the selected one of the plurality of drive signals.

Consistent with an additional aspect of the present disclosure, an apparatus is provided that comprises a first laser configured to supply a first optical signal having a first wavelength, and a first driver circuit having a first input that receives a first control signal, the first driver circuit being configured to select one of a first plurality of drive signals in response to the first control signal. Also, a first optical modulator is provided that is configured to modulate the first optical signal to thereby supply a first modulated optical signal. Each of the first plurality of drive signals corresponds to a respective one of a plurality of modulation formats, such that the first modulated optical signal has a first one of the plurality of modulation formats in response to the selected one of the first plurality of drive signals. A second laser is provided that is configured to supply a second optical signal having a second wavelength different than the first wavelength. Further, a second driver circuit is provided that has a second input that receives a second control signal. The second driver circuit is configured to select one of a second plurality of drive signals in response to the second control signal. In addition, a second optical modulator is provided that is configured to modulate the second optical signal to thereby supply a second modulated optical signal. Each of the second plurality of drive signals corresponds to a respective one of the plurality of modulation formats, such that the second modulated optical signal has a second one of the plurality of modulation formats in response to the selected one of the second plurality of drive signals. The first one of the plurality of modulation formats is different than the second one of the plurality of modulation formats.

It is to be understood that both the foregoing general description and the following detailed description are exemplary and explanatory only and are not restrictive of the invention, as claimed.

The accompanying drawings, which are incorporated in and constitute a part of this specification, illustrate embodiments and together with the description, serve to explain the principles of the disclosure.

BRIEF DESCRIPTION OF THE DRAWINGS

FIG. 10 illustrates an exemplary channel plan consistent with a further aspect of the present disclosure.

DESCRIPTION OF THE EMBODIMENTS

Consistent with the present disclosure, a compact adaptive transmitter is provided that can generate optical signals having different modulation formats and spacing depending on optical link requirements and capacity optimization criteria. In one example, the transmitter includes a photonic integrated circuit having multiple lasers and modulators. A control circuit adjusts the drive signals supplied to the modulators such that optical signals having a desired modulation format may be output from the modulators. Thus, for example, the transmitter may be used to output optical signals having a modulation format suitable for long haul or submarine links, as well as for links having a shorter distance. Moreover, the same photonic integrated circuit may supply optical signals with different modulation formats, such that, for example, those optical signals that are dropped along a link, and thus travel a shorter distance, may have a first modulation format, while other optical signals that travel the entire length of the link may have a second modulation format that is more suited for longer distances. Accordingly, instead of designing and manufacturing different transmitters, the same transmitter, for example, may be used to output optical signals for transmission on a variety of different links.

Moreover, the present disclosure allows for optical link capacity to be optimized based on transmission parameters, such as amplifier gain, link loss, optical signal-to-noise ratio. For example, optical signals at wavelengths that are susceptible to impairments, such as non-linear effects, or that are not adequately amplified by an optical amplifier, may be modulated in accordance with lower rate/less spectrally efficient modulation formats ("low rate formats") that are more noise tolerant. On the other hand, those optical signals at wavelengths that are less susceptible to or do not incur such impairments may be modulated in accordance with highly spectrally efficient/higher rate modulation formats ("high rate formats") that are more noise sensitive. Accordingly, a maximum or optimized capacity may be realized through appropriately choosing, for each channel, a particular modulation format. Such optimized capacity can be readily obtained with the adaptive transmitters described herein.

Reference will now be made in detail to the present exemplary embodiments, examples of which are illustrated in the accompanying drawings. Wherever possible, the same reference numbers will be used throughout the drawings to refer to the same or like parts.

Figure 1:
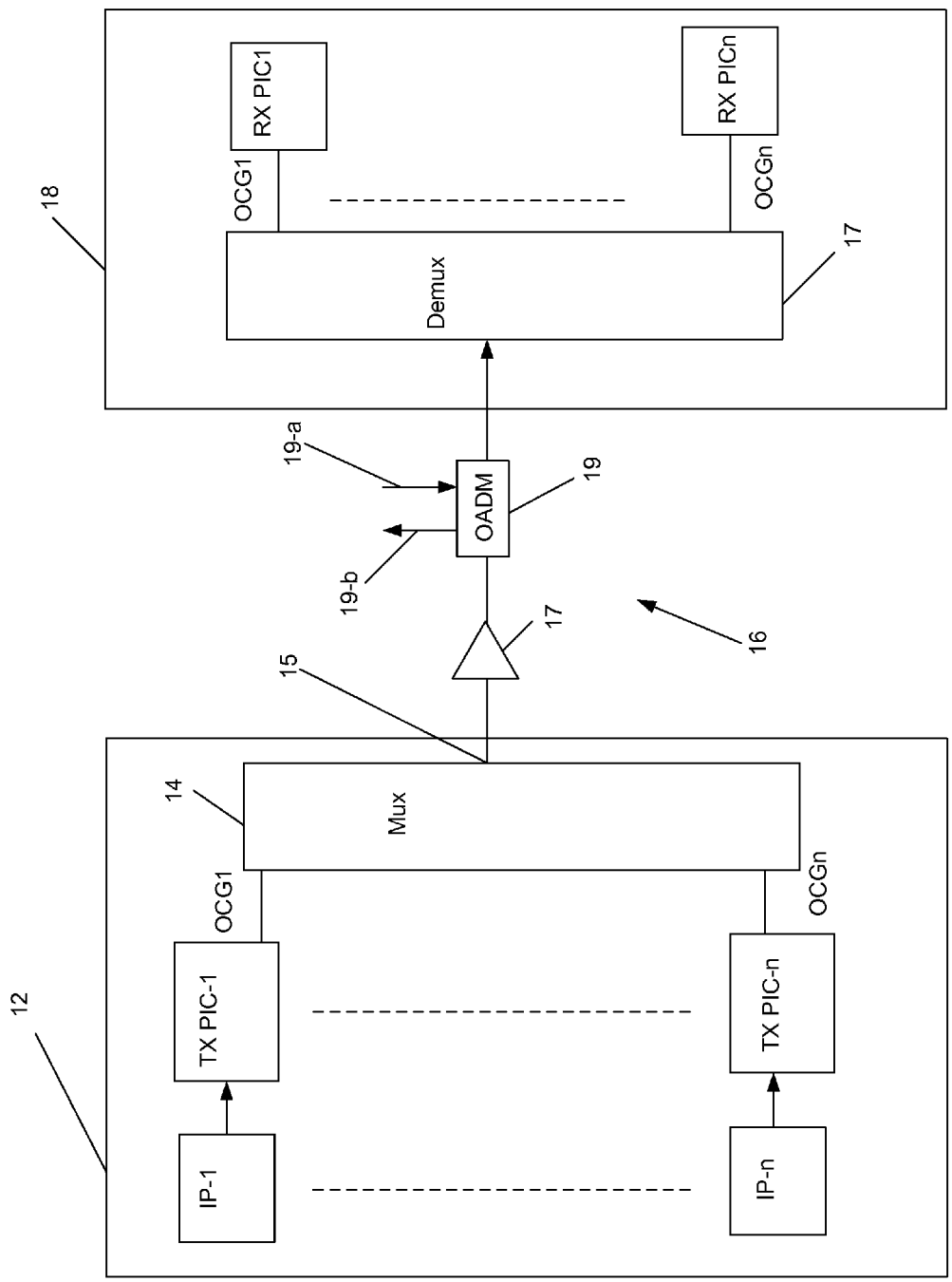
FIG. 1 illustrates an optical communication system consistent with an aspect of the present disclosure.

FIG. 1 illustrates an optical communication system 100 consistent with an aspect of the present disclosure. System 100 includes, for example, a transmit node 12 that has a plurality of photonic integrated circuits TX PIC-1 to TX PIC-n, for example. Each of TX PIC-1 to TX PIC-n receives data from a corresponding one of input blocks IP-1 to IP-n and supplies the data, in encoded form, on a corresponding one of optical carrier groups OCG1 to OCGn to multiplexer 14. Each optical carrier group include a group of optical signals, each of which having a corresponding one of a plurality of wavelengths. Typically the wavelengths of optical signals in each optical carrier group are spectrally spaced from one another by a relatively wide wavelength spacing, such as 100 GHz. Multiplexer 14 may include a known optical interleaver that combines the optical carrier groups in an interleaving fashion. For example, multiplexer 14 may combine and interleave OCGs with 100 GHz spacing to create a spectrally denser wavelength division multiplexed (WDM) signal with channels or optical signals spaced 50 GHz apart. Such interleaving may be repeated, to generate even denser WDM signals having 25 GHz or 12.5 GHz spacings.

As further shown in FIG. 1, the combined OCGs are supplied to an output waveguide 15, which, in turn, feeds the OCGs to optical link or path 16, including an optical fiber, for example. A known optical amplifier, such as an erbium doped fiber amplifier (EDFA) may be provided along optical link 16. In addition, an optical add/drop multiplexer (OADM) may also be provided along path 16 to add optical channels (signals) or OCGs (as represented by arrow 19-a) to or drop optical channels (as represented by arrow 19-b) from optical link 16.

A receiver 18 is configured to receive the OCGs from optical link 16, and a demultiplexer 17, including a known deinterleaver, may separate the OCGs, and supply each to a corresponding one of receiver PICs RX PIC-1 to RX PIC-n (collectively, RX PICs). The RX PICs converts each optical signal within each optical carrier group (OCG) into corresponding electrical signals, which are then further processed by additional circuitry (not shown). Examples of TX PICs and RX PICs are described in U.S. Patent Publication No. 20090245795 and application Ser. No. 12/572,179 the entire contents of both of which are incorporated herein by reference.

Figure 2:
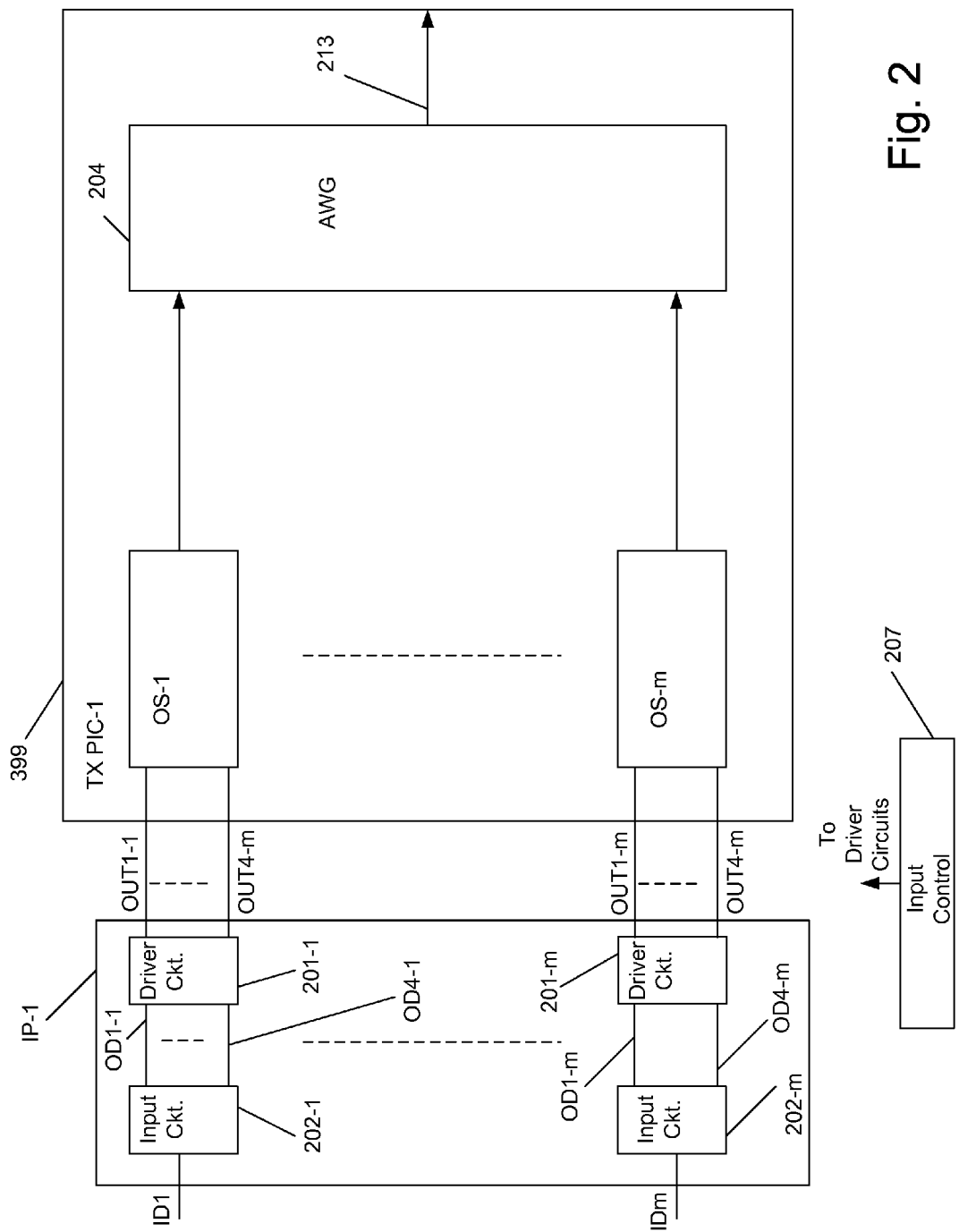
FIG. 2 illustrates a transmitter photonic integrated circuit and associated circuitry consistent with an additional aspect of the present disclosure.

FIG. 2 illustrates TX PIC-1 and associated circuitry in greater detail. It is understood that remaining TX PICs (e.g., TX PIC-2 to TX PIC-m) have the same or similar structure as TX PIC-1. TX PIC-1 includes transmitters or optical sources OS-1 to OS-m coupled to corresponding ones of input circuits 202-1 to 201-$m$, which may be included in input block IP-1, for example. Input circuits 202-1 to 202-$m$ receive a corresponding one of input data streams ID1 to IDm, which are subject to known processing, such as FEC encoding among other processing, and supplies output data (e.g., OD1-1 to OD4-1 to driver circuit 201-1 and outputs OD1-$m$ to OD4-$m$ to driver circuit 201-$m$). Driver circuits 201-1 to 201-$m$, in turn, supply outputs to respective optical sources OS-1 to OS-m (e.g., outputs OUT1-1 to OUT4-1 to optical source OS-1 and outputs OUT1-$m$ to OUT4-$m$ to optical source OS-m). Each of optical sources OS-1 to OS-m supplies a corresponding one of a plurality of modulated optical signals to a multiplexer, such as a known arrayed waveguide grating (AWG) 204. AWG 204, in turn, may be configured to multiplex or combine each of the plurality of optical signals onto output waveguide 213. As discussed in greater detail below, control circuit 207 may be used with adaptive driver circuitry to regulate or change the modulation formats of the optical signals output from optical sources OS-1 to OS-m to optimize or maximize channel capacity.

Figure 3:
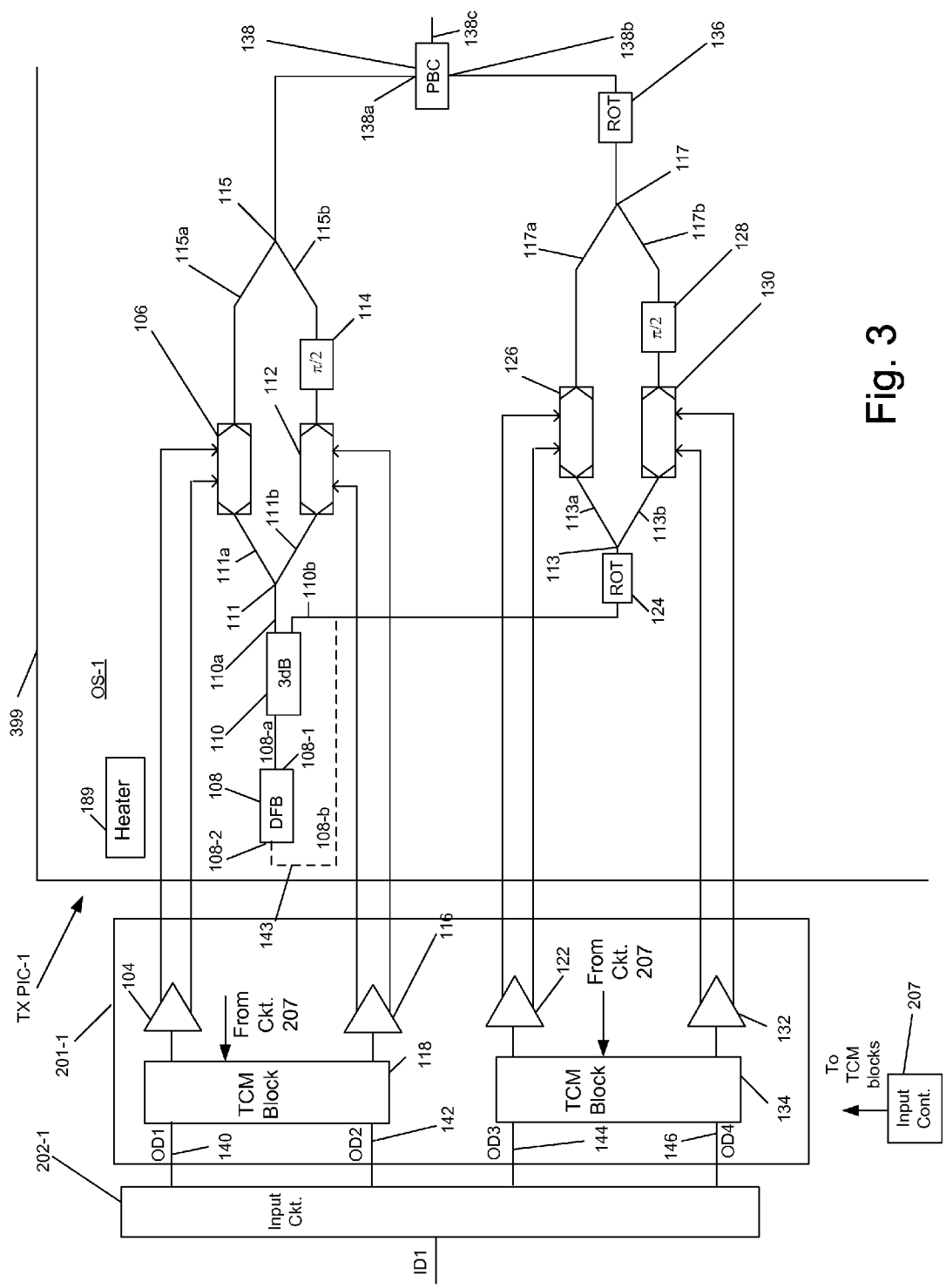
FIG. 3 shows a portion of the transmitter photonic integrated circuit and associated circuitry shown in FIG. 2.

FIG. 3 shows optical source OS-1 and driver circuit 201-1 in greater detail. It is understood that remaining optical sources OS-1 to OS-m have the same or similar structure as optical source OS-1 and that driver circuits 201-2 to 201-*m* have the same or similar structure as driver circuit 201-1. As noted above, input circuit 202-1 receives input data ID1 and outputs corresponding output data OD1 to OD4 to driver circuit 201-1. In the example shown in FIG. 3, data OD1 and OD2 is supplied to trellis code modulation block 118, which may selectively perform a trellis coding modulation (TCM), as described in Ungerboeck (Jet Propulsion Lab., Proceedings of the Mobile Satellite Conference, p 277-282, May, 1988), the contents of which are incorporated herein by reference.

Figure 4A:
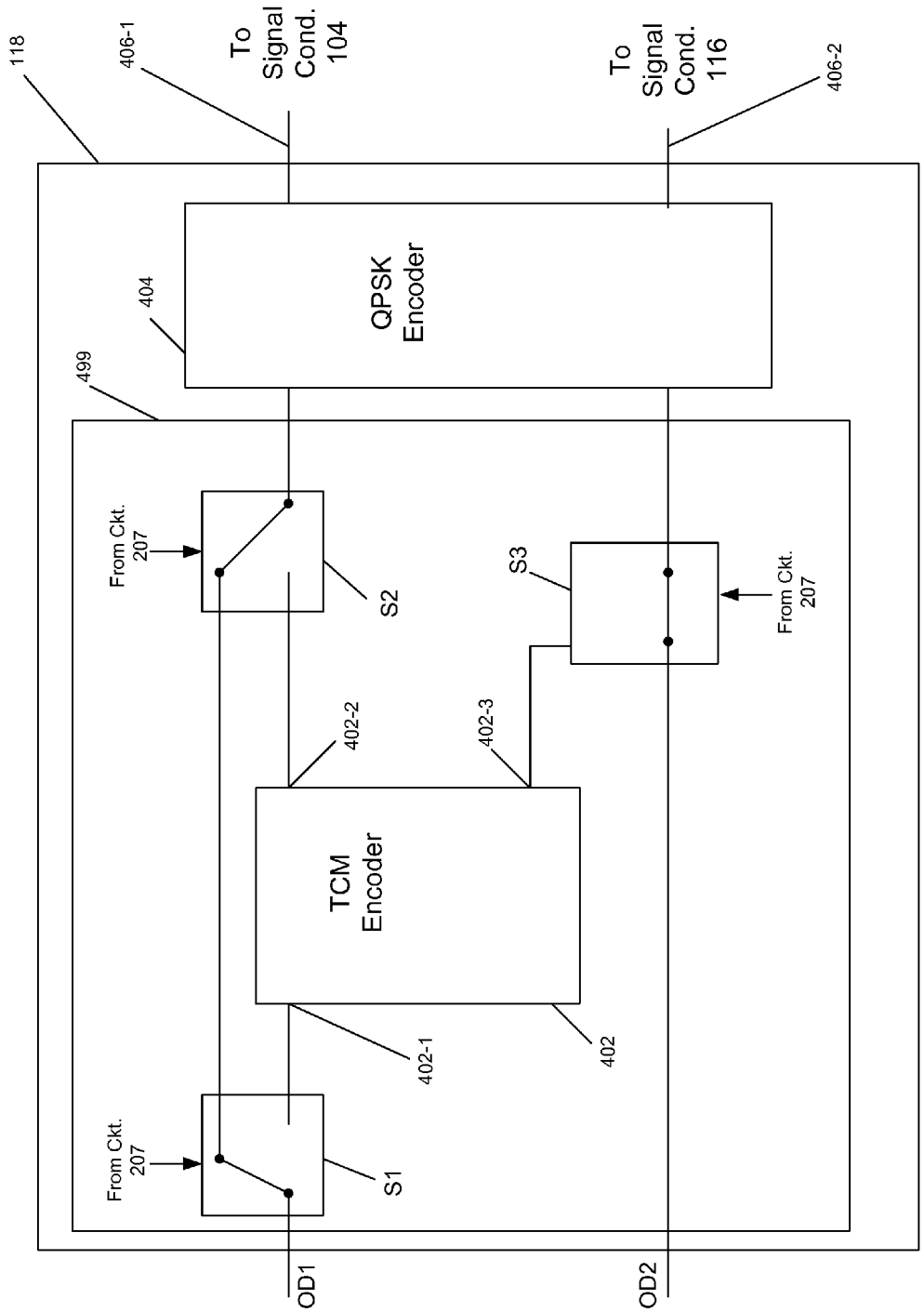
FIG. 4a illustrates a portion of an exemplary driver circuit in a first mode of operation consistent with an aspect of the present disclosure.

FIG. 4*a* illustrates TCM 118 in greater detail. It is understood that TCM block 134 has the same or similar construction as TCM block 118. Moreover, TCM blocks provided in driver circuit 201-2 to 201-*m* have the same or similar structure as TCM 118. TCM block 118 includes TCM/switch circuit 499 having TCM encoder 402 and switches S1, S2, and S3. In a first mode of operation shown in FIG. 4*a*, control input circuit 207 supplies control signals either directly or indirectly to switches S1 and S2, such that these switches are configured to bypass TCM encoder 402 and direct data OD1 to QPSK encoder 404. In QPSK encoder 404, such data is QPSK encoded in a known manner and supplied on output 406-1 to signal conditioning circuit 104. Signal conditioning circuit 104, in turn, supplies signals having an appropriate voltage and/or current to drive Mach-Zehnder (MZ) modulator 106 to supply optical signals modulated in accordance with a QPSK modulation format. Such modulation is based or in accordance with data OD1, which is also in accordance with the data ID1. Such drive signals may correspond to a quadrature (Q) component of the modulated optical signals output from MZ modulator 106.

As further shown in FIG. 4*a*, switch S3 is configured in response to further control signals output from control input circuit 207, such that data OD2 is also supplied to QPSK encoder circuit 404. As a result, corresponding QPSK encoded data is supplied at output 406-2 to signal conditioning circuit 116, which operates in a manner similar to that of signal conditioning circuit 104, to supply signals having an appropriate voltage and/or current to appropriately drive MZ modulator 112. MZ modulator 112, in turn, supplies optical signals modulated in accordance with a QPSK modulation format in response to the drive signals output from signal conditioning circuit 104. Such drive signals are in accordance with the data OD2, which is also in accordance with data ID1, and may correspond to an in-phase component of the modulated optical signal output from MZ modulator 112. Thus, in the above example, control signals output from input control circuit 207 designate a QPSK mode of operation, such that, in response to such control signals, drive signals corresponding to a QPSK modulation format are output from driver circuit 201-1. A QPSK mode of operation may be desirable for those optical channels or signals that are transmitted over shorter distances and/or are not subject to substantially transmission impairments, such as non-linearities or noise. The QPSK modulated signals carry data in accordance with corresponding drive signals.

A second mode of operation, in which driver circuit 118 supplies TCM encoded drive signals will next be described with reference to FIG. 4*b*. In connection with this mode of operation, a lower rate/less spectrally efficient, but higher noise tolerant modulation format may be preferred for optical channels propagating over longer distances or subject to substantial transmission impairments. As such, drive signals associated with data OD1 are generated by driver circuit 118, but not data OD2.

Figure 4B:
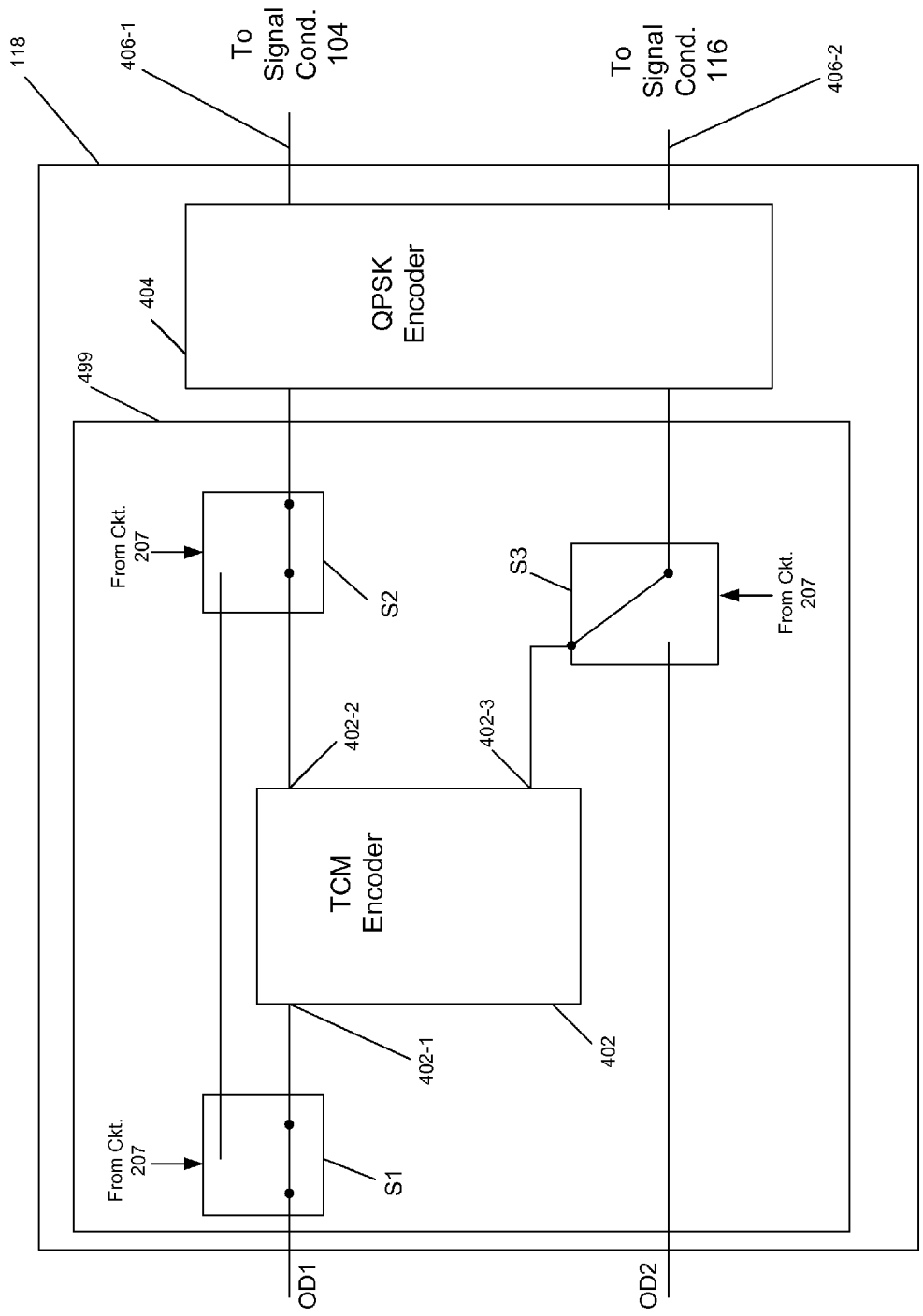
FIG. 4b illustrates a portion of an exemplary driver circuit in a second mode of operation consistent with an additional aspect of the present disclosure.

In particular, in the example shown in FIG. 4*b*, control signals are supplied to switch circuitry S1 to direct data OD1 to input 402-1 of TCM encoder circuit 402. In response to such data, TCM encoder circuit 402 supplies TCM modulated data at outputs 402-2 and 402-3, and switches S2 and S3 are configured, base on further control signals supplied from input control circuit 207, to direct such data to QPSK encoder circuit 404. Next, QPSK encoder circuit 404 supplies signals to signal conditioning circuits 104 and 116 from outputs 406-1 and 406-2, respectively. These signals carry data associated with data OD1, but also carry overhead or coding data to provide additional coding gain to facilitate transmission over greater distances and/or over links having substantial transmission impairments.

As further shown in FIG. 3, data OD3 and OD4 are supplied from input circuit 202-1 to TCM block 134, which has the same or similar construction as TCM block 118. As such, TCM block 134 supplies outputs to signal conditioning circuits 122 and 132, which generate drive signals that are supplied to modulators 126 and 130. In a manner similar to that described above, such drive signals may be selected or designated by control signals supplied by input control circuit 207 to driver circuit 201-1, for example, so that one of QPSK or TCM-QPSK modulated optical signals are output from modulators 126 and 130, respectively, depending on various optical link characteristics and transmission impairments.

Returning to FIG. 3, optical transmitter or source OS-1 is provided on substrate 399 and includes a laser 108, for example, a distributed feedback laser (DFB) to supply light to at least four (4) modulators 106, 112, 126 and 130. In particular, DFB 108 outputs continuous wave (CW) light to a dual output splitter or coupler 110 (e.g. a 3db coupler) having an input port and first and second output ports. Typically, the waveguides used to connect the various components of optical source OS-1 may be polarization dependent. A first output 110*a* of coupler 110 supplies the CW light to first branching unit 111 and the second output 110*b* supplies the CW light to second branching unit 113. A first output 111*a* of branching unit 111 is coupled to modulator 106 and a second output 111*b* is coupled to modulator 112. Similarly, first output 113*a* is coupled to modulator 126 and second output 113*b* is coupled to modulator 130. Modulators 106, 112, 126 and 130 may be as noted, for example, Mach Zehnder (MZ) modulators. Each of the MZ modulators receives CW light from DFB 108 and splits the light between two (2) arms or paths. As generally understood, an applied electric field in one or both paths of a MZ modulator create may change the phase of light output from the MZ modulator.

Each of the MZ modulators 106, 112, 126 and 130 is driven with signals from driver circuit 201-1, which may include precoder circuits (not shown) that may perform differential encoding. The CW light supplied to MZ modulator 106 from DFB 108 and branching unit 111 is modulated with the encoded data from signal condition circuit 104, and the modulated optical signal from MZ modulator 106 is supplied to first input 115*a* of branching unit 115. Similarly, the CW light supplied to MZ modulator 112 via DFB 108 and branching unit 111 is modulated with another output from signal conditioning circuit 116. The modulated optical signal from MZ modulator 112 is supplied to phase shifter 114, which shifts the phase of the signal 90° ($\pi/2$) to generate one of an in-phase (I) or quadrature (Q) components, which is supplied to second input 115*b* of branching unit 115. The modulated optical signals from MZ modulator 106, which includes the other of the I and Q components, and from MZ modulator 112 are supplied to polarization beam combiner (PBC) 138 via branching unit 115.

Signal conditioning circuit 122 is used to drive MZ modulator 126, which outputs modulated optical signals as one of the I and Q components. A polarization rotator 124 may optionally be disposed between coupler 110 and branching unit 113. Polarization rotator 124 may be a two port device that rotates the polarization of light propagating through the device by a particular angle, usually an odd multiple of 90°. The CW light supplied from DFB 108 is rotated by polarization rotator 124 and is supplied to MZ modulator 126 via first output 113*a* of branching unit 113. MZ modulator 126 then modulates the drive signal conditioning circuit 122 onto the polarization rotated CW light supplied by DFB 108. The modulated data signal from MZ modulator 126 is supplied to first input 117*a* of branching unit 117.

As further shown in FIG. 3, an output from signal conditioning circuit 132 is used to drive MZ modulator 130. The CW light supplied from DFB 108 is also rotated by polarization rotator 124 and is supplied to MZ modulator 130 via second output 113*b* of branching unit 113. MZ modulator 130 then modulates the received CW light in accordance with the output from signal conditioning circuit 132. The modulated optical signal from MZ modulator 130 is supplied to phase shifter 128 which shifts the phase the incoming signal 90° ($\pi/2$) and supplies the other of the I and Q components to second input 117*b* of branching unit 117.

Alternatively, polarization rotator 136 may be disposed between branching unit 117 and PBC 138 and replaces rotator 124. In that case, the polarization rotator 136 rotates both the modulated optical signals from MZ modulators 126 and 130 rather than the CW signal from DFB 108 before modulation. The modulated data signal from MZ modulator 126 is supplied to first input port 138*a* of polarization beam combiner (PBC) 138. The modulated data signal from MZ modulator 130 is supplied to second input port 138*b* of polarization beam combiner (PBC) 138. PBC 138 combines all four (4) of the modulated data signals from branching units 115 and 117 and outputs a multiplexed optical signal to output port 138*c*. In this manner, a single DFB laser 108 provides a CW signal to four (4) separate MZ modulators 106, 112, 126 and 130 for modulating at least four (4) separate data channels by utilizing phase shifting and polarization rotation of the transmission signals. Previously, multiple CW light sources were used for each channel which increased device complexity, chip real estate, power requirements and associated manufacturing costs.

Alternatively, splitter or coupler 110 may be omitted and DFB 108 may be configured as a dual output laser source to provide CW light to each of the MZ modulators 106, 112, 126 and 130 via branching units 111 and 113. In particular, coupler 110 may be replaced by DFB 108 configured as a back facet output device. Both outputs of DFB laser 108, from respective sides 108-1 and 108-2 of DFB 108, are used, in this example, as the signal source. A first output 108*a* of DFB 108 supplies CW light to branching unit 111 connected to MZ modulators 106 and 112. The back facet or second output 108*b* of DFB 108 supplies CW light branching unit nit 113 connected to MZ modulators 126 and 130 via path or waveguide 143 (represented as a dashed line in FIG. 3*a*). The dual output configuration provides sufficient power to the respective MZ modulators at a power loss less than that experienced through 3 dB coupler 110. The CW light supplied from second output 108*b* is supplied to waveguide 143 which is either coupled directly to branching unit 113 or to polarization rotator 124 disposed between DFB 108 and branching unit 113. Polarization rotator 124 rotates the polarization of CW light supplied from second output 108*b* of DFB 108 and supplies the rotated light to MZ modulator 126 via first output 113*a* of branching unit 113 and to MZ modulator 130 via second output 113*b* of branching unit 113. Alternatively, as noted above, polarization rotator 124 may be replaced by polarization rotator 136 disposed between branching unit 117 and PBC 138. In that case, polarization rotator 136 rotates both the modulated signals from MZ modulators 126 and 130 rather than the CW signal from back facet output 108*b* of DFB 108 before modulation.

The polarization multiplexed output from PBC 138, may be supplied to multiplexer 204 in FIG. 2, along with the polarization multiplexed output from remaining optical sources OS-2 to OS-m, to AWG 204, which, in turn, supplies one of optical carrier groups, OCG1, to multiplexer 14. It is understood that each of remaining TX PICs may be provided on a corresponding substrate, such as substrate 399, and operated in a similar fashion. Moreover, it is understood that each of the remaining TX PiCs may include the same or similar structure as TX PIC-1 shown in FIG. 2.

Figure 5:
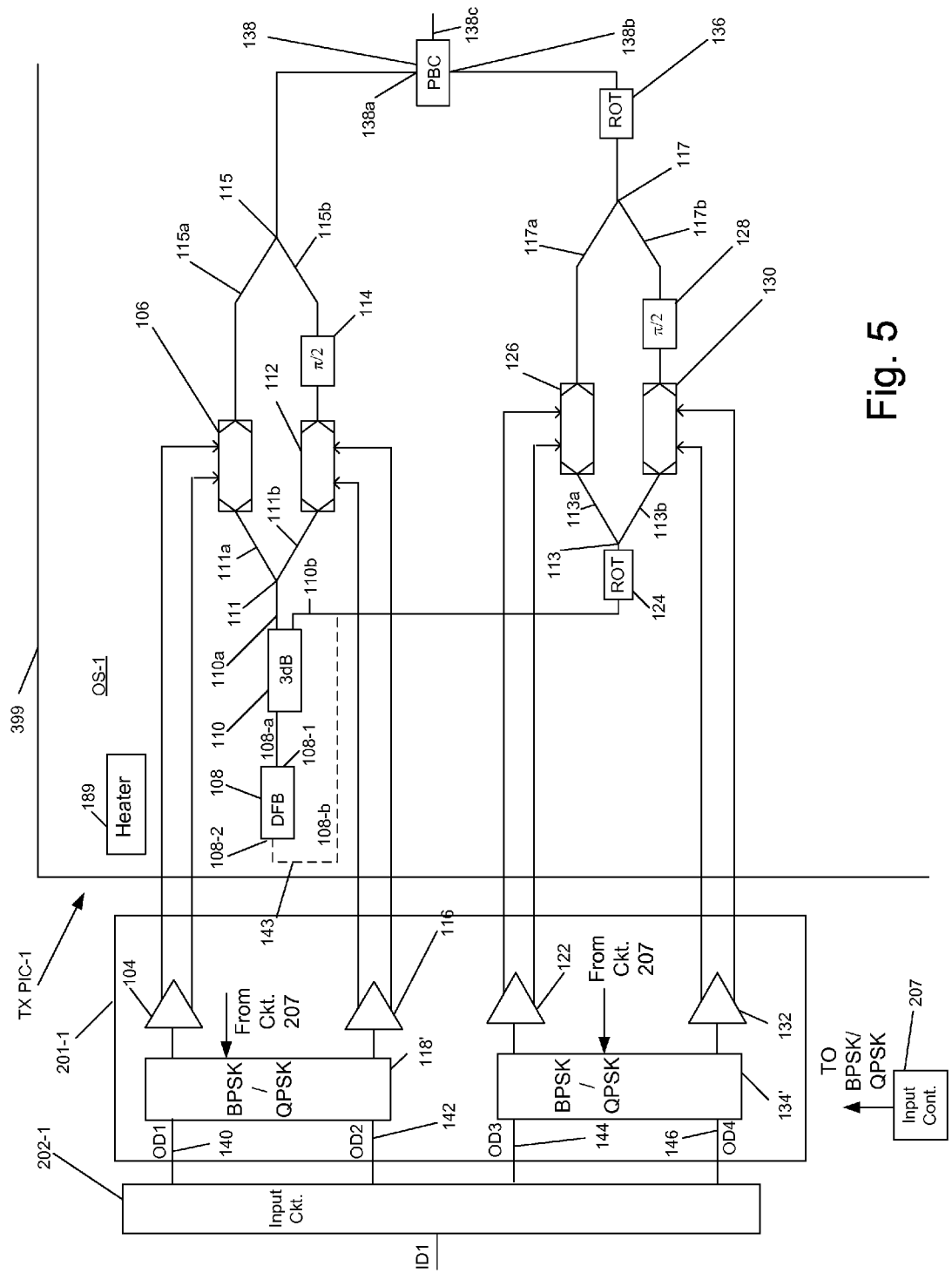
FIG. 5 illustrates shows a portion of the transmitter photonic integrated circuit FIG. 2 and alternative associated circuitry.

FIG. 5 illustrates an example of a driver circuit 201-1 consistent with an additional aspect of the present disclosure. FIG. 5 includes many of the features discussed above in connection with FIG. 3. In FIG. 5, however, TCM encoder circuits 118 and 134 in driver circuit 201-1 are replaced with BPSK/QPSK circuits 118' and 134', respectively. It is understood that in this regard, remaining driver circuits 201-2 to 201-*m* may have the same or similar construction as driver circuit 201-1 and each may include BPSK/QPSK circuits as in driver circuit 201-1. The BPSK/QPSK circuits are provided so that each driver circuit is may selectively output drive signals so that modulators in optical sources OS-1 to OS-m of TX PIC-1, as well as in the remaining TX PICs (TXPIC-2 to TX PIC-n) supply optical signals modulated in accordance with one of the BPSK and QPSK formats.

Figure 6A:
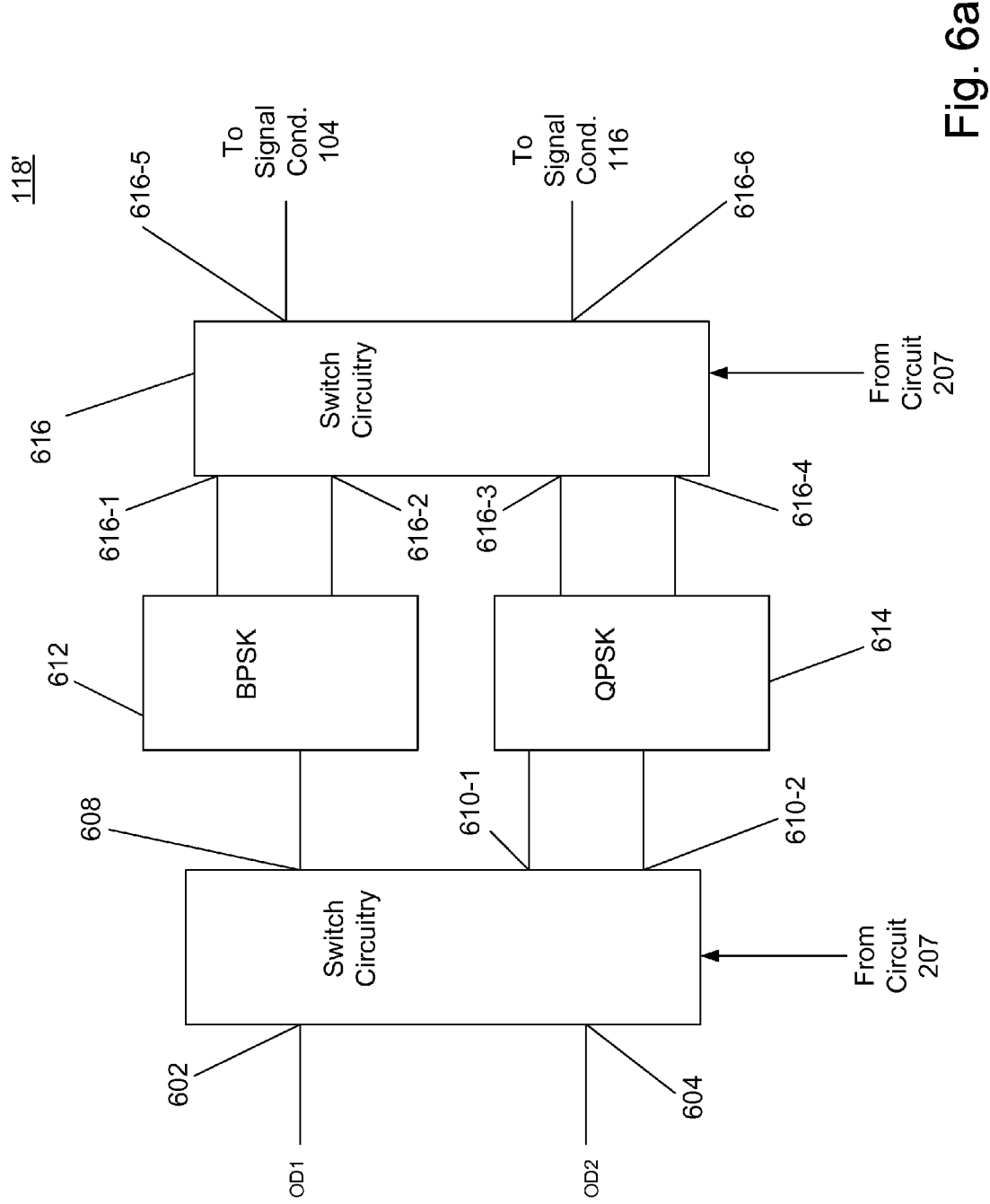
FIG. 6a illustrates a portion of the driver circuit shown in FIG. 5 in greater detail consistent with an aspect of the present disclosure.

FIG. 6*a* illustrates BPSK/QPSK circuit 118' in greater detail. It is understood that BPSK/QPSK circuit 134' has the same or similar construction as BPSK/QPSK circuit 118'. BPSP/QPSK circuit 118' includes switch circuitry 606 having a first input 602 that receives data OD1 and a second input 604 that receives data OD2. Input control circuit 207 may supply control signals to select a first mode of operation in which data OD1 and OD2 are supplied to QPSK encoder circuit 614 from outputs 610-1 and 610-2. QPSK encoder circuit 614, in turn, supplies QPSK encoded outputs to corresponding inputs 616-3 and 616-4, respectively, of switch circuitry 616. Under control of additional control signals from input control circuit 207, switch circuitry 616 directs the QPSK encoded data to outputs 616-5 and 616-6, which are coupled to corresponding signal conditioning circuits 104 and 116, respectively. As noted above, the drive signal conditioning circuits (104, 116) supply appropriate drive signals to MZ modulators 106 and 114, which output QPSK modulated optical signals, in this example.

As noted above, optical signals modulated in accordance with a QPSK modulation format may be desirable to provide higher data rate transmission over shorter distances or optical links having reduced transmission impairments. Over links having high transmission impairments or for transmission over greater distances, BPSK modulated optical signals, having a lower data rate but being less susceptible to transmission impairments, may alternatively be transmitted instead of the TCM-QPSK modulated optical signals discussed above. Accordingly, in FIG. 6a, if BPSK modulated optical signals are desired to be output from TX PIC1, control signals from input control circuit 207 are provided to switch circuitry 606 so that data OD1 is supplied from output 608 to BPSK encoder circuit 612. Since BPSK, has a lower data rate, data OD2 is not supplied to BPSK encoder circuit 612.

In a known manner, BPSK encoder circuit 612 supplies encoded signals to inputs 616-1 and 616-2 of switch circuit 616, which, in turn, supplies the encoded signals to signal conditioning circuits 104 and 116. As a result, drive signals supplied by circuits 104 and 116 cause MZ modulators 106 and 112 to supply BPSK modulated optical signals.

It is understood that BPSK/QPSK circuit 134' operates in a similar fashion as circuit 118' so that driver circuit 201-1 selective outputs either BPSK or QPSK drive signals, as selected by control signals supplied by input control circuit 207.

It is further understood that driver circuits 201-2 to 201-m operate include the same or similar structure as driver circuit 201-1 and may include either circuits 118 and 134 or circuits 118' and 134'. In addition, driver circuits 201-2 to 201-m may operate in the same or similar fashion as that described above in connection with driver circuit 201-1.

Moreover, the structure and operation of input block IP-1 (see FIG. 1), including driver circuits 201-1 to 201-m may be the same or similar as the structure and operation of input blocks IP-2 to IP-n and remaining TX PICs (TX PIC-2 to TX PIC-n) may have the same or similar structure and operation as TX PIC-1.

Thus, for example, consistent with the present disclosure, a first laser (e.g., laser 108) may be provided that is configured to supply a first optical signal having a first wavelength. A first driver circuit (e.g., driver circuit 201-1) is also provided that has a first input that receives a first control signal from input control circuit 207, for example. The first driver circuit (201-1) is configured to select one of a first plurality of drive signals (e.g., drive signals corresponding to one of a QPSK/BPSK or QPSK TCM-QPSK modulation format) in response to the first control signal. A first optical modulator, such as MZ modulator 106, or collectively one or more of modulators 106, 112, 126 or 130, is also provided that is configured to modulate the first optical signal to thereby supply a first modulated optical signal, e.g., a modulated optical signal having a QPSK format. Each of the first plurality of drive signals corresponds to a respective one of a plurality of modulation formats (e.g., QPSK/BPSK or QPSK TCM-QPSK modulation formats), such that the first modulated optical signal has a first one of the plurality of modulation formats (QPSK) in response to the selected one of the first plurality of drive signals.

In addition, consistent with the present disclosure, a second laser is provided which is configured to supply a second optical signal having a second wavelength different than the first wavelength. The second laser may be a laser similar to laser 108 but provided on substrate (similar to substrate 399 shown in FIG. 2) of TX PIC-n. A second driver circuit, such as a driver circuit provided in input block IP-n may also be provided having a second input that receives a second control signal (from another input control circuit coupled to input block IP-n). The second driver circuit is configured to select one of a second plurality of drive signals in response to the second control signal, as with the first driver circuit (e.g. 201-1) noted above. In addition, a second optical modulator (e.g., one or more optical modulators similar to modulators 106, 112, 126, and 130 in TX PIX-n) may be provided that is configured to modulate the second optical signal to thereby supply a second modulated optical signal. In addition, each of the second plurality of drive signals correspond to a respective one of the plurality of modulation formats, as with the first driver circuit (e.g., 201-1) discussed above. Accordingly, the second modulated optical signal (output from TX PIC-n, for example) may have a second one of the plurality of modulation formats in response to the selected one of the second plurality of drive signals (which may be BPSK or TCM-QPSK, for example), whereby the first one of the plurality of modulation formats (e.g., QPSK) is different from the second one of the plurality of modulation formats (e.g., either BPSK or TCM-QPSK).

Figure 6B:
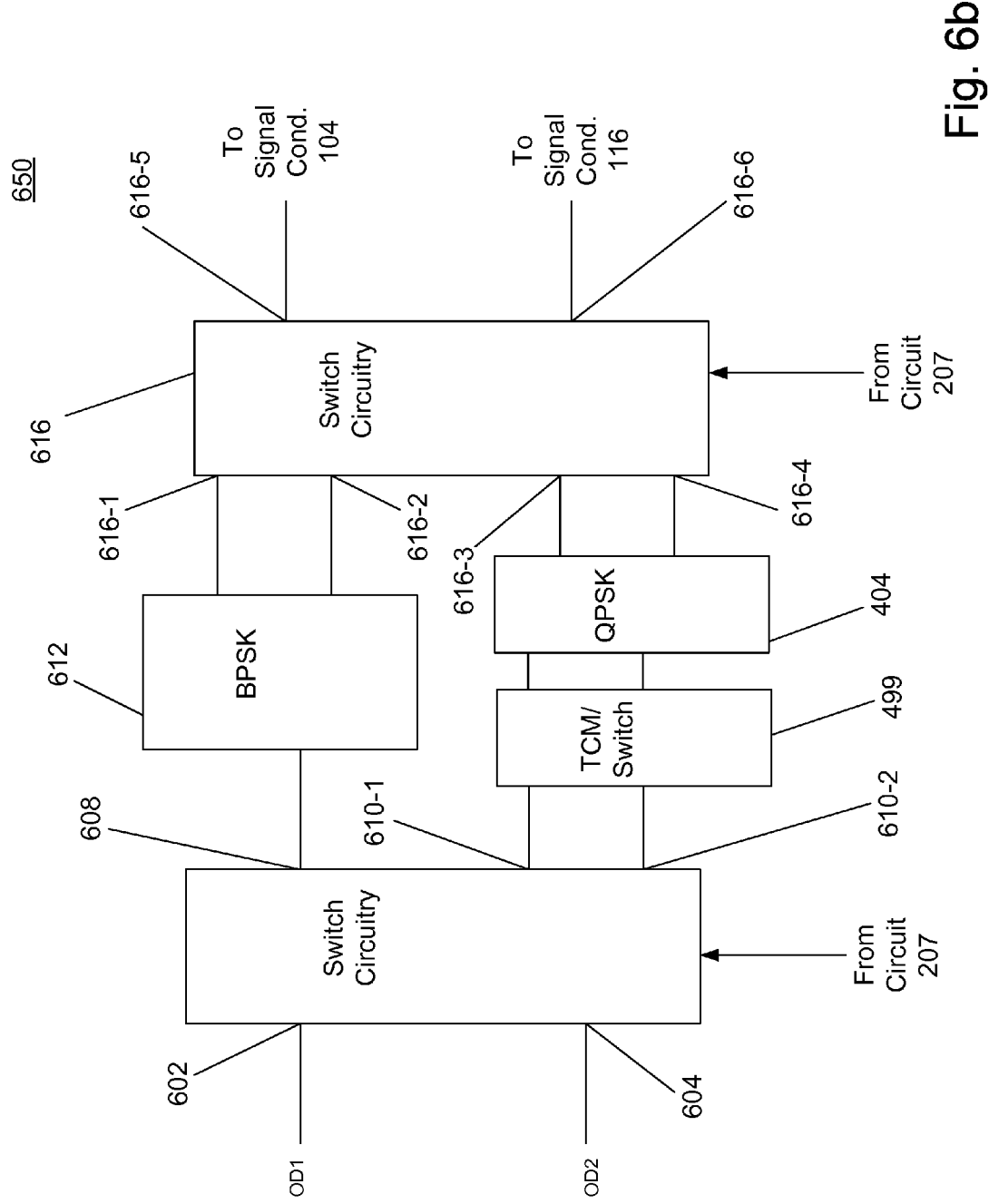
FIG. 6b illustrates a portion of the driver circuit shown in FIG. 5 consistent with an alternative aspect of the present disclosure.

FIG. 6b illustrates an alternative example of a circuit portion 650 of driver circuit 201-1 which may supply encoded data corresponding to one of three modulation formats, e.g., BPSK, TCM-QPSK or QPSK. Circuit portion 650 may be provided in remaining driver circuits 201-2 to 202-m and may be similar to BPSP/QPSK circuit 118' shown in FIG. 6a. In circuit portion 650, however, QPSK encoder circuit 614 is replaced by TCM/Switch circuit 499 and QPSK encoder circuit 404 discussed above in connection with FIGS. 4a and 4b. In operation, circuit portion 650 may supply BPSK encoded data from BPSK encoder circuit 612, as discussed above in connection with FIG. 6a. Alternatively, circuit portion 650 may supply one QPSK encoded data or TCM-QPSK encoded data as discussed above in connection with FIGS. 4a and 4b. Accordingly, circuit portion 650 combines features of TCM block 118 and BPSK/QPSK block 118' so that driver circuit 201-1 may selectively supply drive signals associated one of three modulation formats, for example, BPSK, TCM-QPSK or QPSK.

As noted above, in one example, circuit portions 650 may be provided in driver circuits 201-1 to 201-m, so that optical signals having different wavelengths may be modulated with different modulation formats. That is, a first optical signal having a first wavelength may be modulated in accordance with a BPSK modulation format, a second optical signal having a second wavelength may be modulated in accordance with a TCM-QPSK modulation format, and a third optical signal having a third wavelength may be modulated in accordance with a QPSK modulation format.

Preferably, the driver circuits discussed above may be provided to achieve optimal performance for each channel. Thus, for example, if one or more optical signals propagating in an optical fiber are susceptible to non-linearities, such as cross-phase modulation, four wave mixing and self phase modulation, drive signals may be provided to generate BPSK modulated optical signals, which are more tolerant of such non-linearities, i.e., have a lower bit error rate. On the other hand, if other optical signals propagating in the same optical fiber incur a substantial amount of noise, additional drive signals may be supplied to generate TCM-QPSK modulated optical signals, which have an associated bit error rate that is relatively low. Moreover, optical signals that do not incur substantial non-linearities or noise, may be QPSK modulated to thereby have a higher data rate. Circuit portion 650 is advantageous in that each of the drive signals discussed above may be generated from circuitry having a compact design.

Figure 7:
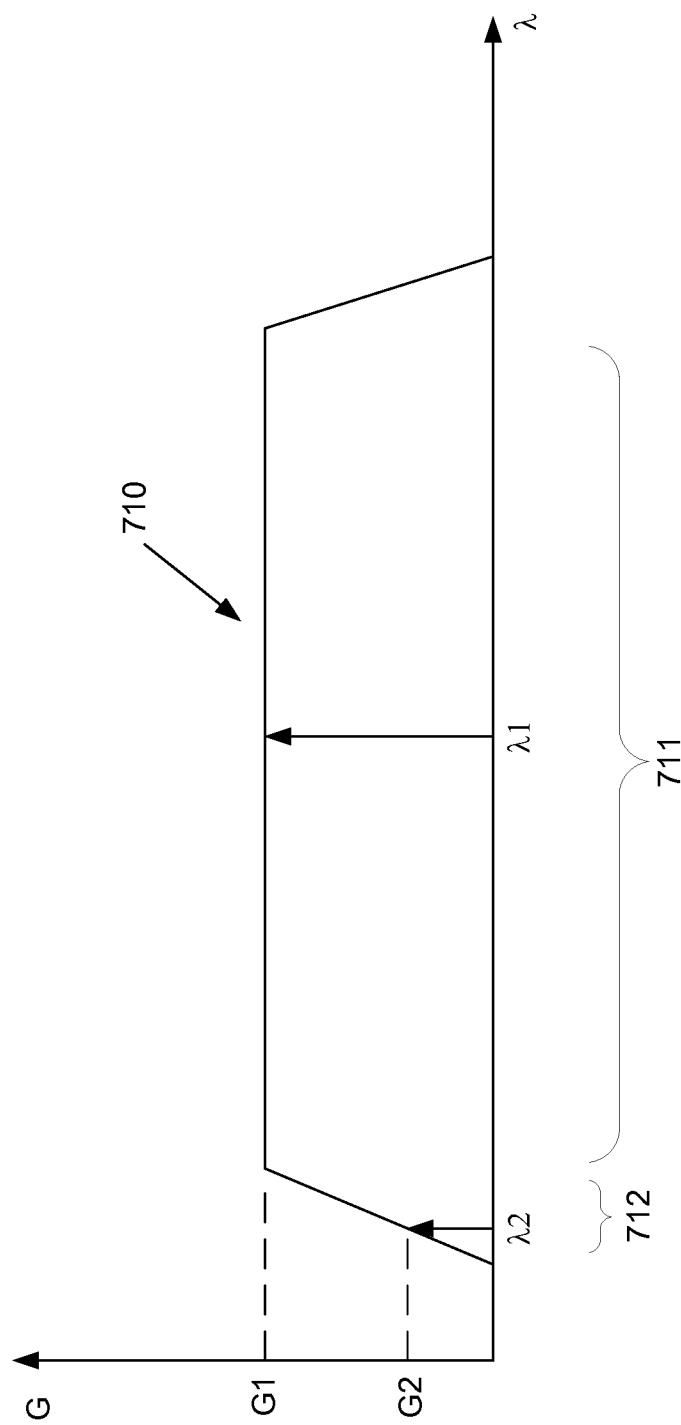
FIG. 7 illustrates an example of a gain spectrum of an optical amplifier consistent with the present disclosure.

Further examples of the present disclosure will next be described with reference to FIGS. 7 and 8. FIG. 7 illustrates a gain spectrum 710 of optical amplifier 17. Gain spectrum 710 may be spectrally flattened in a known manner. Gain spectrum 710 has an associated first gain G1 over a first spectral range 711 and a second gain G2 at a wavelength within a second spectral range 712. As shown in FIG. 7, the second spectral range may be in the "tail" of gain spectrum 710. Conventionally, optical channels or signals have not been provided with wavelengths in the tail of the gain spectrum, thereby leading to less efficient data transmission. Consistent with the present disclosure, however, optical signals having higher data rate formats (e.g., QPSK) may be transmitted in the higher gain region of gain spectrum 710 (e.g., λ1), while optical signals (e.g., λ2) with lower data rate formats (e.g., BPSK or TCM-QPSK) may be transmitted in the "tail" in order to more fully utilize the entire gain spectrum 710 for data transmission.

Figure 8:
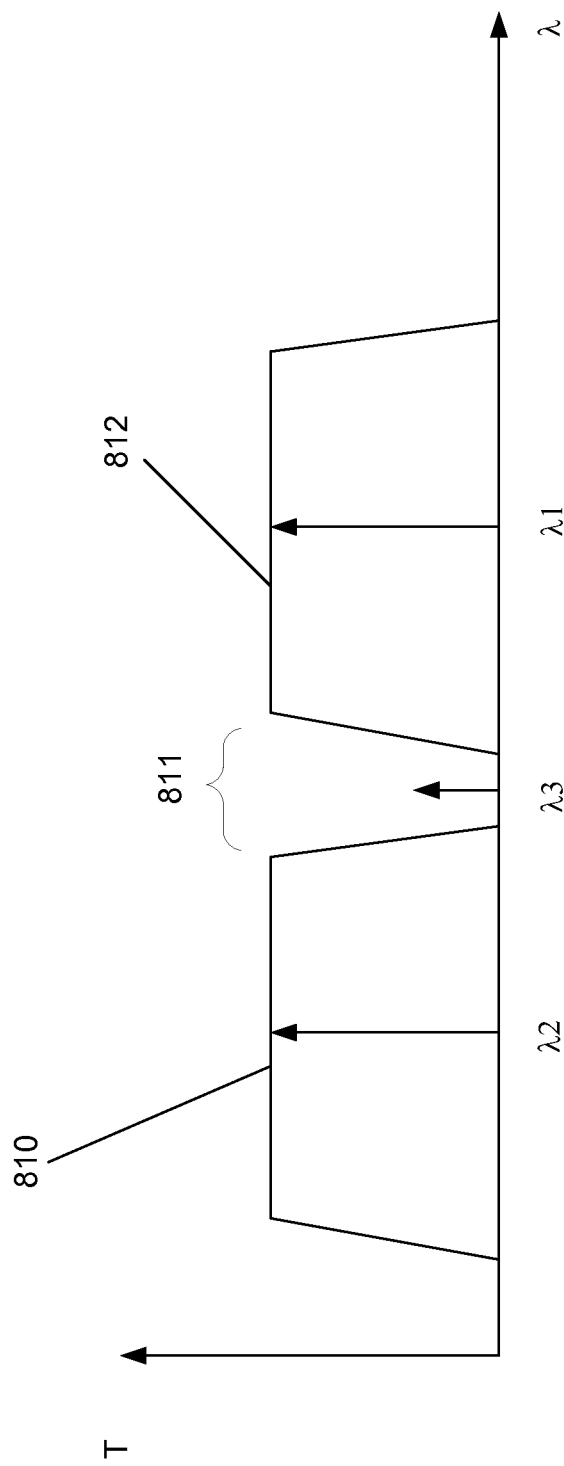
FIG. 8 illustrates exemplary filter characteristics consistent with the present closure.

FIG. 8 illustrates a transmission characteristic 800 associated with filters that may be present in OADM 19 shown in FIG. 1. Transmission characteristic 800 includes first (810) and second (812) passbands and a guard band 811 there between. As shown in FIG. 8, the guard band has relatively low transmission, and, therefore, in conventional optical communication system, no channels are transmitted with wavelengths in guard band 811. Consistent with an additional aspect of the present disclosure, however, optical signals having higher data rate formats (e.g., QPSK) may be transmitted at wavelengths in passbands 810 and 812 (e.g., at wavelengths λ1 and λ2), while optical signals (e.g., λ3) with lower data rate formats (e.g., BPSK or TCM-QPSK) may be transmitted in guard band 811 in order to more fully utilize the bandwidth of link 16 in FIG. 1.

Transmission parameters include a loss associated with optical fiber link 16, a gain associated with optical fiber link 16 (such as a gain associated with one or more optical amplifiers 17, a signal quality (Q) associated with each of the modulated optical signals, an optical signal-to-noise ratio (OSNR) of each modulated optical signal. In addition, the transmission parameters or impairments include non-linearities, such as four-wave mixing, self-phase modulation, cross-phase modulation. Other transmission parameters or impairments include chromatic dispersion or polarization mode dispersion.

Figure 9:
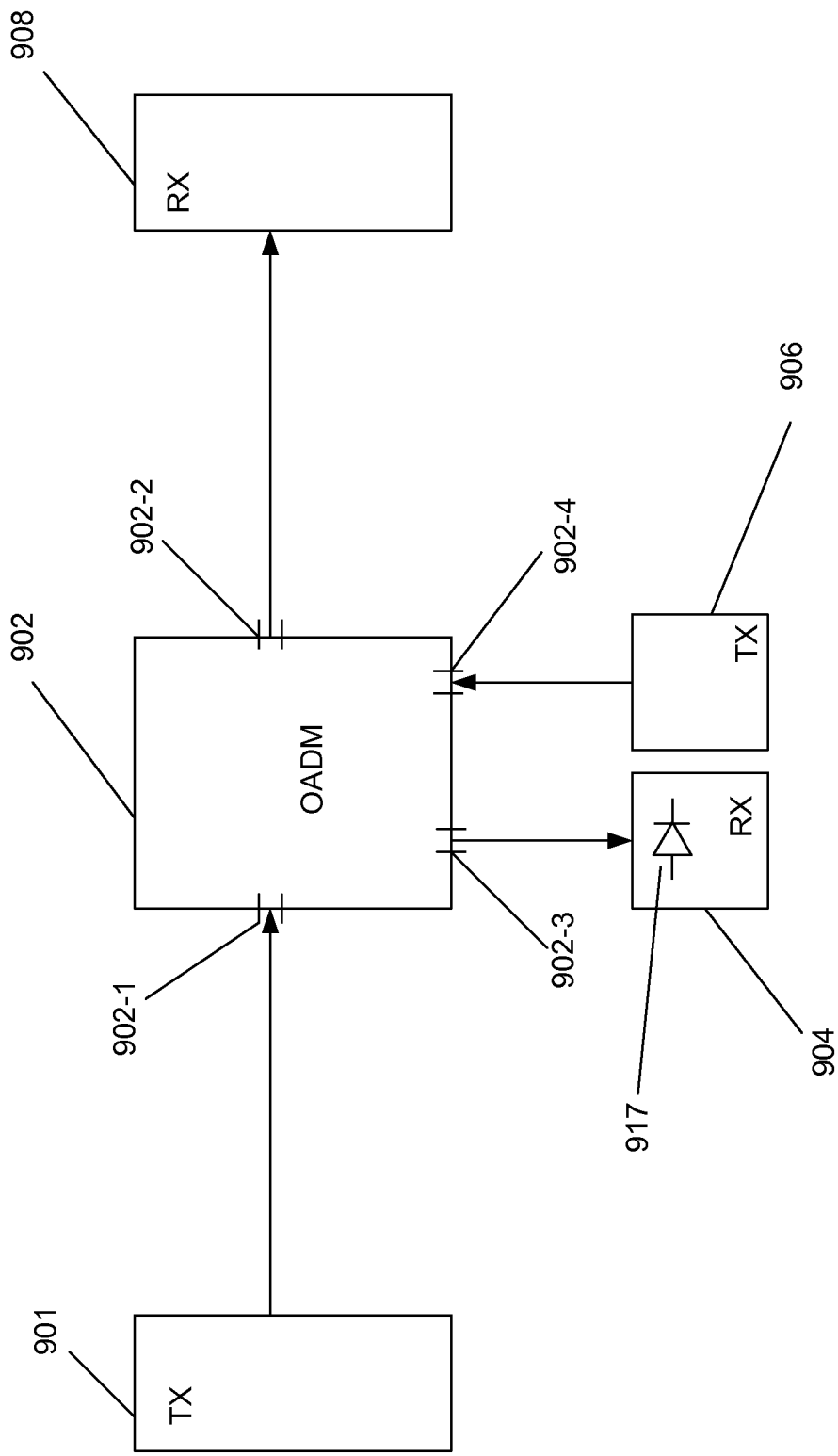
FIG. 9 illustrates an example of an optical system consistent with an aspect of the present disclosure.

FIG. 9 illustrates an optical system 900 consistent with an additional aspect of the present disclosure. Optical system 900 includes a transmit node 901 which supplies a wavelength division multiplexed (WDM) optical signal to an input of an optical add/drop multiplexer (OADM) 902. OADM 902 has an input portion 902-1 that receives the WDM optical signal, and supplies or drops some of the optical signals or channels in the WDM optical signal through output port 902-2. Remaining optical signals in the WDM optical signal are passed or transmitted through OADM 902 and output at port 902-4. A receiver 904 is provided to detect and process the optical signals output from port 902-2. For example, receiver 904 may include one or more photodiodes, such as photodiode 917 to convert the dropped optical signal or a portion thereof into a corresponding electrical signal. In addition, a transmitter 906 is provided that supplies optical signals, which typically have the same wavelengths as those that were dropped at port 902-2. The optical signals output from transmitter 906 are fed to port 902-3 of OADM 902, and combined with the passed-through optical signals and output at port 902-4. The resulting WDM optical signal output from OADM 902 is supplied to a receiver node 908.

In the example shown in FIG. 9, driver circuits and modulators similar to those discussed above may be provided in transmit node 901 and configured to supply optical signals, which have a modulation format, such as QPSK suitable for transmission over shorter distances. Such optical signals may then be dropped and added by OADM 902. In addition, other driver circuits and modulators in transmit node 901, configured as further discussed above, may supply optical signals having a modulation format, such as TCM-QPSK for transmission over longer distances. Such optical signals may be passed through OADM 902 to receiver node 908.

FIG. 10 illustrates an exemplary channel plan 1000 consistent with an aspect of the present disclosure. Channel plan 1000 includes even channels or wavelengths, such as channels λ2, λ4, λ6, and λ8, as well as odd channels λ1, λ3, λ5, and λ7. Typically, each odd channel is provided between a pair of adjacent even channels. Also, each optical channel may be spectrally spaced from one another by 50 GHz, for example. In systems having mid-range impairments (i.e., impairments that are not excessive), such as noise and non-linear effects, selected channels may be modulated in accordance with a higher rate format, such as QPSK, as discussed above, while other channels may be modulated with lower rate formats, such as BPSK or TCM-QPSK. Thus, in the example shown in FIG. 10, even channels λ2, λ4, λ6, and λ8 may be QPSK modulated, while odd channels λ1, λ3, λ5, and λ7 may be TCM-QPSK or BPSK modulated to optimize capacity. Further, the optical power of the lower rate (odd) channels may be reduced by either attenuating the optical signals with a variable optical attenuator, for example, or by lowering the output power of a corresponding laser. Thus, each of the lower rate (odd) channels may have an optical power that is less than an optical power of each of the higher rate (even) channels. As a result, reduced power of the lower rate (odd) channels may simultaneously reduce the non-linearities (e.g., cross-phase modulation, four wave mixing, and self phase modulation) and increase the optical signal-to-noise ratio (OSNR) of those channels that are modulated at the higher rate (here, the even channels). Alternatively, the even channels and odd channels may be reversed in the above example, such that the even channels are TCM-QPSK or BPSK modulated and the odd channels are QPSK modulated. Further, in another example, optical signal or channel λ1 may be modulated with a BPSK modulation format, optical channel λ2 may be modulated in accordance with a TCM-QPSK modulation format, and optical channel λ3 may be modulated in accordance with a QPSK modulation format. Each of optical signal or channel in the example shown in FIG. 10 may be supplied by a corresponding transmitter or optical source, such as that shown in FIGS. 1 and/or 2. It has been observed through simulation that an effective gain associated with the BPSK modulated optical signals is 2.5 dB relative to QPSK modulated optical signals having twice the data rate as the BPSK modulated optical signals. In addition, it has been observed through simulation that an effective gain associated with the TCM-QPSK modulated optical signals is 5.5 dB relative to QPSK modulated optical signals having twice the data rate as the BPSK modulated optical signals.

Thus, consistent with the present disclosure, capacity of an optical link may be optimized with circuitry that permits supplying optical signals with multiple formats tailored for each channel and each optical link. As further discussed above, an adaptive compact transmitter may be provided in order to achieve such optimized optical capacity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
a trellis coding modulation (TCM) encoder circuit configured to output first and second encoded data in response to first data;
a first driver circuit configured to supply first drive signals in response to the first and second encoded data;
a first modulator configured to supply a first modulated optical signal having a first wavelength in response to the first drive signals;
a second drive circuit configured to receive second and third data and supply second drive signals in response to the second and third data;
a second modulator configured to output a second modulated optical signal in response to the second drive signals, the second modulated optical signal having a second wavelength different than the first wavelength; and
an optical amplifier configured to be coupled to an optical communication link, the optical amplifier having a gain spectrum, such that a first spectral range within the gain spectrum has an associated first gain and a tail of the gain spectrum, which is a second spectral range within the gain spectrum, has an associated second gain, the first gain being greater than the second gain, such that the first wavelength of the first optical signal is within the first spectral range and the second wavelength of the second optical signal is within the tail of the gain spectrum,
wherein the first modulated optical signal is modulated in accordance with a QPSK modulation format and the second modulated optical signal is modulated in accordance with a TCM-QPSK modulation format, such that the second modulated optical signal is a QPSK modulated optical signal that carries TCM encoded information.

2. A system, comprising:
a first plurality of optical transmitters, each of which supplying a corresponding one of a first plurality of optical signals, each of the first plurality of optical signals having a corresponding one of a first plurality of wavelengths, and being modulated in accordance with a QPSK modulation format;
a second plurality of optical transmitters, each of which supplying a corresponding one of a second plurality of optical signals, each of the second plurality of optical signals having a corresponding one of a second plurality of wavelengths, and being modulated in accordance with a TCM-QPSK modulation format, such that each of the second plurality of optical signals is modulated in accordance with the QPSK modulation format and carries TCM encoded information; and
an optical combiner configured to combine each of the first plurality of optical signals and each of the second plurality of optical signals onto an optical link,
wherein each of the first plurality of wavelengths and each of the second plurality of wavelengths conform to a channel plan, the channel plan having alternating even and odd channels, each of the first plurality of wavelengths corresponding to a respective one of the even channels, and each of the second plurality of wavelengths corresponding to a respective one of the plurality of odd channels, and each of the first plurality of optical signals has an associated power level that is less than a power level associated with each of the second plurality of optical signals.

3. A system, comprising:
a first plurality of optical transmitters, each of which supplying a corresponding one of a first plurality of optical signals, each of the first plurality of optical signals having a corresponding one of a first plurality of wavelengths, and being modulated in accordance with a first modulation format;
a second plurality of optical transmitters, each of which supplying a corresponding one of a second plurality of optical signals, each of the second plurality of optical signals having a corresponding one of a second plurality of wavelengths, and being modulated in accordance with a second modulation format; and
an optical combiner configured to combine each of the first plurality of optical signals and each of the second plurality of optical signals onto an optical link,
wherein an optical power associated with each of the first plurality of optical signals is less than an optical power associated with each of the second plurality of optical signals, and wherein the first modulation format is a TCM-QPSK modulation format, and the second modulation format is a QPSK modulation format, such that each of the first plurality of optical signals being QPSK modulated optical signals that carry TCM encoded information.

* * * * *